United States Patent [19]

Fisher

[11] Patent Number: 5,034,893

[45] Date of Patent: Jul. 23, 1991

[54] GRAPHICAL DISPLAY OF TIMING ADVANCE DATA

[75] Inventor: James A. Fisher, Tucson, Ariz.

[73] Assignee: Clean Air Technologies, Inc., New York, N.Y.

[21] Appl. No.: 335,623

[22] Filed: Apr. 10, 1989

[51] Int. Cl.⁵ ....................... G01M 15/00; F02P 17/00

[52] U.S. Cl. ........................... 364/431.01; 364/424.03; 340/439; 73/117.3

[58] Field of Search ....................... 364/431.01, 431.03, 364/431.04, 551.01, 424.03; 340/439, 461, 462; 73/117.3

[56] References Cited

U.S. PATENT DOCUMENTS

| | | | |
|---|---|---|---|
| 4,125,894 | 11/1978 | Cashel et al. | 364/442 |
| 4,145,746 | 3/1979 | Trussell et al. | 364/551 |
| 4,179,922 | 12/1979 | Bouverie | 364/431.04 |
| 4,234,921 | 11/1980 | Kinoshita et al. | 364/431.01 |
| 4,337,515 | 6/1982 | Kreft | 364/431.03 |
| 4,373,186 | 2/1983 | Marshall et al. | 364/431.04 |
| 4,375,672 | 3/1983 | Kato et al. | 364/431.04 |
| 4,399,407 | 8/1983 | Kling et al. | 324/379 |
| 4,417,467 | 11/1983 | Higgs et al. | 73/117.3 |
| 4,418,388 | 11/1983 | Allgor et al. | 364/431.04 |
| 4,425,791 | 1/1984 | Kling | 73/117.3 |
| 4,472,779 | 9/1984 | Marino et al. | 364/431.01 |
| 4,476,531 | 10/1984 | Marino et al. | 364/431.01 |
| 4,517,468 | 5/1985 | Kemper et al. | 364/551.01 |
| 4,602,127 | 7/1986 | Neely et al. | 364/431.03 |
| 4,787,053 | 11/1988 | Moore | 364/551.01 |
| 4,800,378 | 1/1989 | Putrow et al. | 364/431.03 |
| 4,812,768 | 3/1989 | Quinn | 364/551.01 |
| 4,812,979 | 3/1989 | Hermann et al. | 364/551.01 |
| 4,922,443 | 5/1990 | Coetsier et al. | 364/551.01 |

*Primary Examiner*—Parshotam S. Lall
*Assistant Examiner*—Gary D. Yacura
*Attorney, Agent, or Firm*—Schweitzer, Cornman & Gross

[57] ABSTRACT

Vehicle parameters are sensed at each of a plurality of engine speeds and are used to calculate different type vehicle performance signals, which are displayed together in a rectangular coordinate system having an engine speed axis and axes perpendicular thereto, one for each different type of vehicle performance signal, each performance signal being displayed in alphanumeric characters and connected with line segments, to identify the type of performance signal.

9 Claims, 11 Drawing Sheets

GRAPHICAL DISPLAY OF TIMING ADVANCE DATA

DESCRIPTION

1. Technical Field

This invention relates to data display formats, and more particularly to a graphics mode data display format of vehicle timing advance data.

2. Background Art

The early prior art of automotive test equipment is characterized by the use of separate test instruments, such as ammeters, dwellmeters, tachometers and oscilloscopes. These instruments are characterized by digital and analog data displays. A vehicle performance test often requires a plurality of these instruments to be connected simultaneously. For example, in a vehicle engine timing advance test, it is desired to know values for engine timing, vacuum, dwell, and speed. Thus, the operator is required to connect a timing light, vacuum meter, dwellmeter, and tachometer respectively, and simultaneously evaluate each instrument's display. This leads to interpretation time delays because the lack of proximity of the instruments to one another requires the operator to shift his field of view between the instruments.

The more modern prior art of automotive test equipment is characterized by computer-based engine testers featuring a video monitor for display of test procedures and results. However, such testers do not always provide a satisfactory display format for easy interpretation of test data. For example, it is known to numerically display the aforementioned timing advance data parameters on the video monitor. However, this numerical display format can increase operator interpretation time, especially if viewed from a distance.

DISCLOSURE OF INVENTION

An object of the present invention is to provide apparatus for visually displaying data in a format that reduces operator interpretation time of the data content.

According to the present invention, vehicle parameters are sensed at a plurality of engine speeds, and signals indicative of vehicle performance criteria are calculated using algorithmic subroutines from the sensed signals at each speed; the values of the calculated signals are displayed on a display screen as plotted points in a rectangular coordinate system display format having a scaled ordinate labeled per the characteristic units of each calculated performance signal and having a scaled abscissa labeled in engine speed. In further accord with the present invention, each vehicle performance criterion has its plotted points connected together by a line, each line having different visual characteristics so as to differentiate between the different criteria. In still further accord with the present invention, the plotted points for each vehicle performance criterion are labeled with an alphanumeric character chosen to identify the points with the corresponding criterion.

The invention reduces human interpretation time of numerical data by displaying vehicle performance data graphically instead of numerically. The invention also reduces interpretation time by presenting a plurality of different data parameters together in a graphics display format on the same display screen of a video monitor. The simultaneous display reduces interpretation time because it reduces the number of fields of view.

Other objects, features and advantages of the present invention will become more apparent in light of the following detailed description of exemplary embodiments thereof, as illustrated in the accompanying drawing.

BEST MODE FOR CARRYING OUT THE INVENTION

Figure 1:
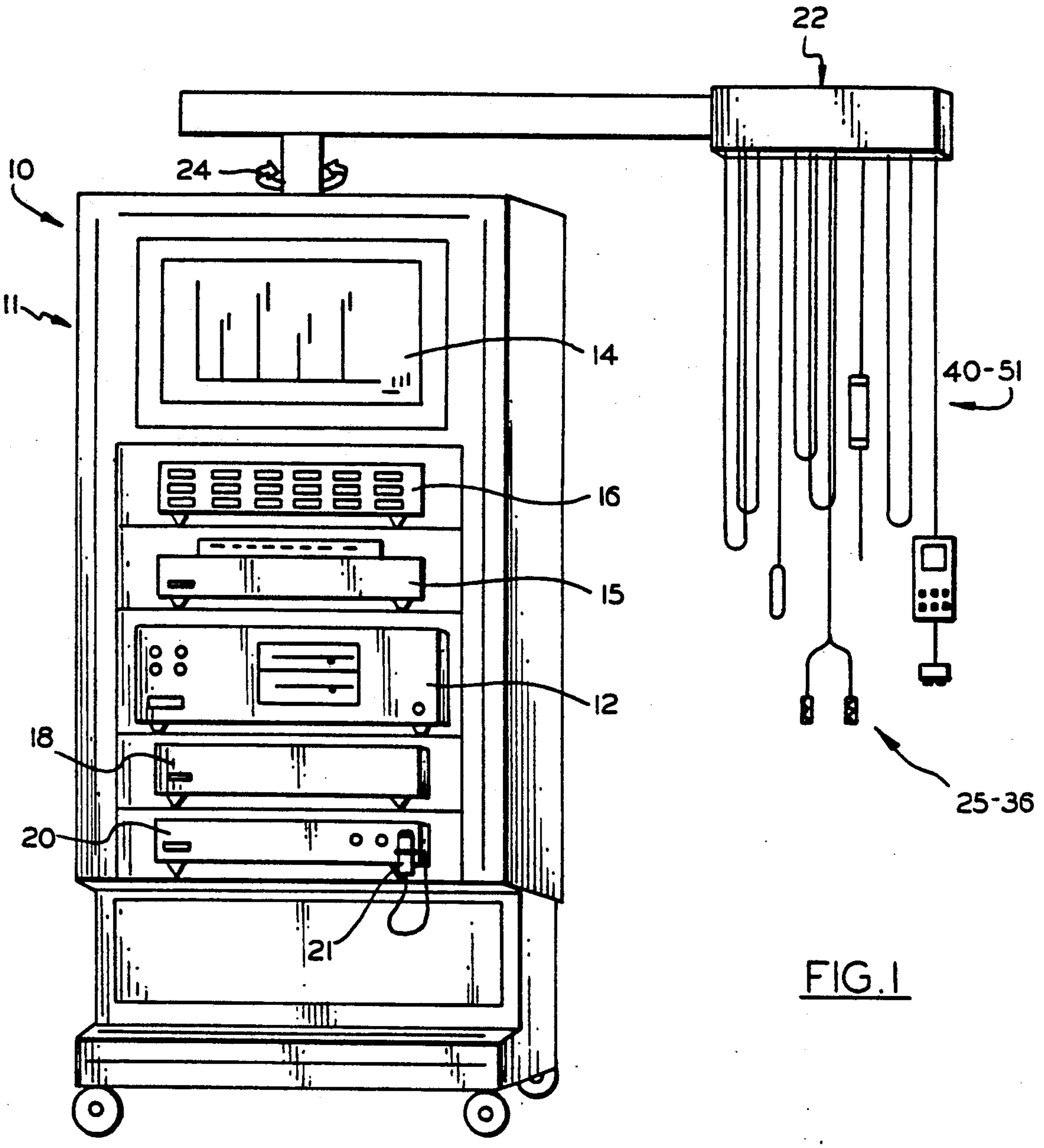
FIG. 1 is a perspective illustration of one type of automotive diagnostic system in which the present invention may be used.

Referring to FIG. 1, the present invention may be used in equipment 10 that aids an operator in the diagnosis and repair of automobiles. The equipment 10 is computer-based to provide automated testing of vehicle-mounted components and subsystems, including ignition, electrical, fuel and emission systems, and on-board computers. The equipment includes a transportable console 11 which houses a customer interface unit (CIU) computer 12, video monitor 14, printer 15, keyboard 16, data acquisition unit (DAU) 18, and computerized emissions analyzer (CEA) 20.

The CIU computer 12 comprises the main data processing unit for the equipment and is described (together with the monitor 14, printer 15 and keyboard 16) in more detail hereinafter with respect to FIG. 4. The DAU 18 comprises the primary signal processing unit of the equipment and is described in more detail hereinafter with respect to FIG. 3. The CEA 20 is a microprocessor-based unit that measures the concentrations of four types of gases in the vehicle exhaust: hydrocarbon (HC), carbon monoxide (CO), carbon dioxide ($CO_2$), and oxygen ($O_2$) The CEA 20, including exhaust probe 21, is designed to be compliant with the BAR-84 and BAR-90 emissions test standards.

The equipment also includes a rotatable boom 22 (as indicated by the rotational arrowheads 24) which houses a plurality of engine probes 25–36 connected to the boom by corresponding signal lines 40–51

Figure 2:
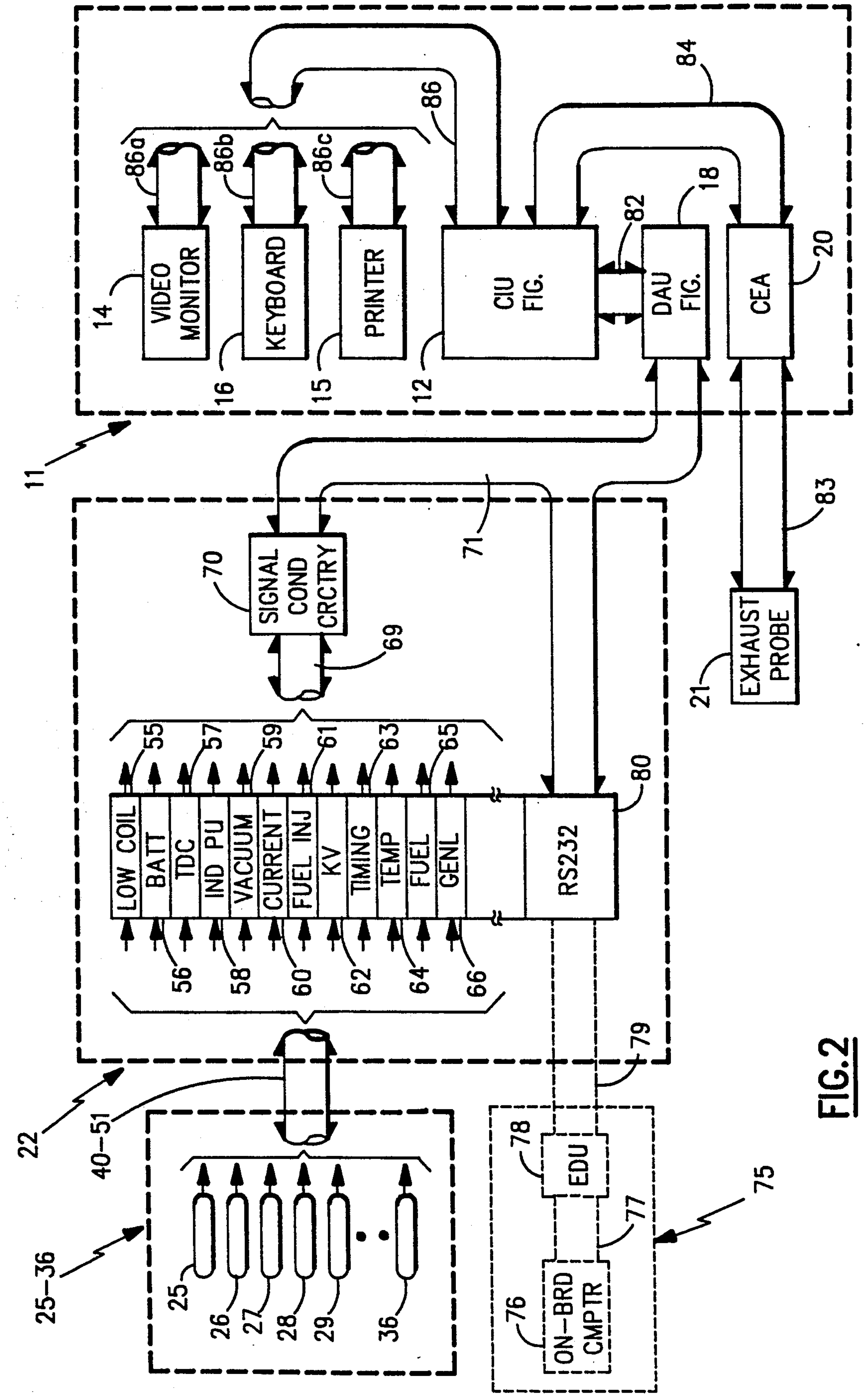
FIG. 2 is a block diagram of the automotive diagnostic system of FIG. 1.

FIG. 2 is a block diagram illustration of the equipment 10. The engine probes 25-36 include a low coil probe 25 for measuring the voltage on the primary side of the vehicle ignition coil, battery leads 26 for measuring battery voltage, a top dead center (TDC) probe 27 for sensing the TDC identification notch on the vehicle engine vibration damper, an inductive pickup 28 for measuring the number one (#1) cylinder spark firing signal, and a vacuum sensor 29 for measuring intake manifold vacuum.

Other probes include a current probe 30 for measuring battery current and starter current, a fuel injection probe 31 for measuring the fuel injection solenoid pulse, a KV probe 32 for measuring per cylinder peak spark plug firing voltage and spark duration, a timing light 32 for measuring engine timing when the TDC probe 27 is not used, a temperature probe 34 for measuring various engine temperatures, a fuel pressure probe 35 for measuring fuel pressure, and two general purpose multimeter leads 36 for making various resistance and voltage measurements.

The signal lines 40-51 attach to the boom 22 with corresponding known type, connectors 55-66. The lines are insulated to protect them from the harsh garage environment. The sensed signals are presented on signal lines 69 to signal conditioning circuitry 70, which presents the conditioned signals on signal lines 71 to the DAU 18.

Apparatus 75 is illustrated as comprising an on-board computer 76, signal lines 77, a portable electronic diagnostic unit (EDU) 78, and communications link 79. The phantom lines indicate that the apparatus 75 is not part of the equipment 10, but only connects to the equipment at the boom 22.

The on-board computer 76 is installed on recent model year vehicles and provides signals indicative of vehicle performance on the lines 77 to a connector (not shown) located either under the vehicle hood or in the vehicle passenger compartment. The EDU 78, which accesses the connector, may comprise a Monitor 2000, provided by OTC Tool & Equipment Division, Sealed Power Corporation, Owatonna, Minnesota. The Monitor 2000, which is a hand held unit with a single line, nine character alphanumeric display, provides the performance signals on the communications link 79, typically an RS232 serial data link. The link 79 connects to the boom 22 at an RS232 connector 80, which presents the performance signals on the lines 71 to the DAU 18. By connecting the EDU to the equipment 10, a greater number of parameters can be displayed on the monitor 14 than on the EDU itself.

The DAU communicates with the CIU computer 12 by a communications link 82, e.g., an SCSI high-speed parallel data link. The sensed exhaust gases from the exhaust probe 21 travel through a hose 83 to the CEA 20. The CEA-processed signals are presented to the CIU computer on a communications link 84, e.g., an RS232 serial data link.

The CIU computer directs the operation of the monitor 14, printer 15, and keyboard 16 through lines 86; specifically, monitor lines 86*a*, keyboard lines 86*b*, and printer lines 86*c*. Communication with each device is in conformance with the appropriate industry standard for that particular type of device.

Figure 3:
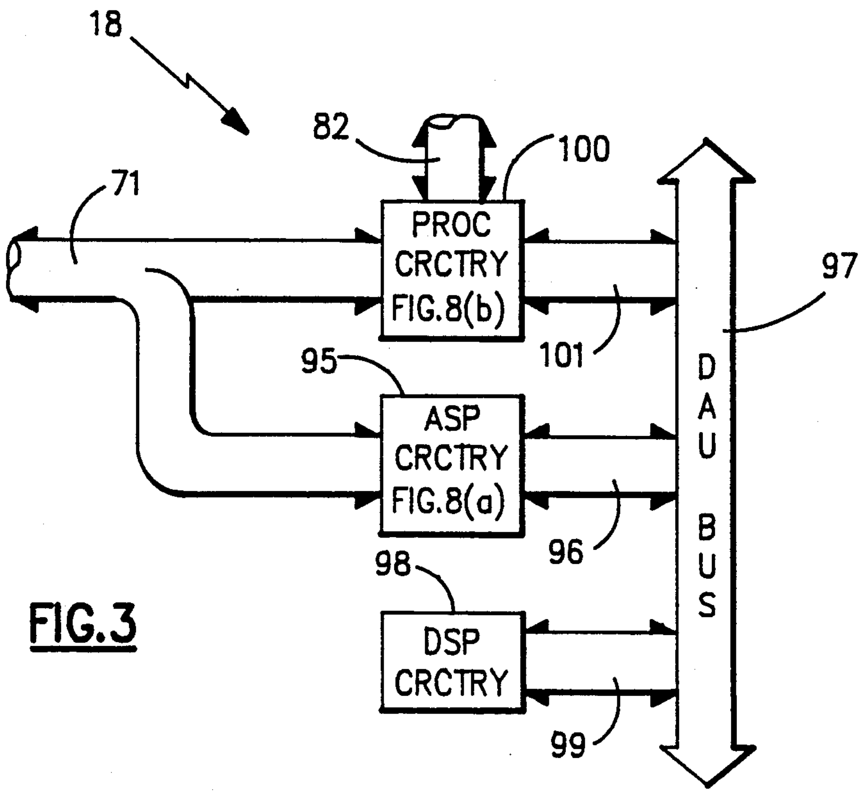
FIG. 3 is a block diagram of selected elements of the automotive diagnostic system of FIG. 2.
Figure 8A:
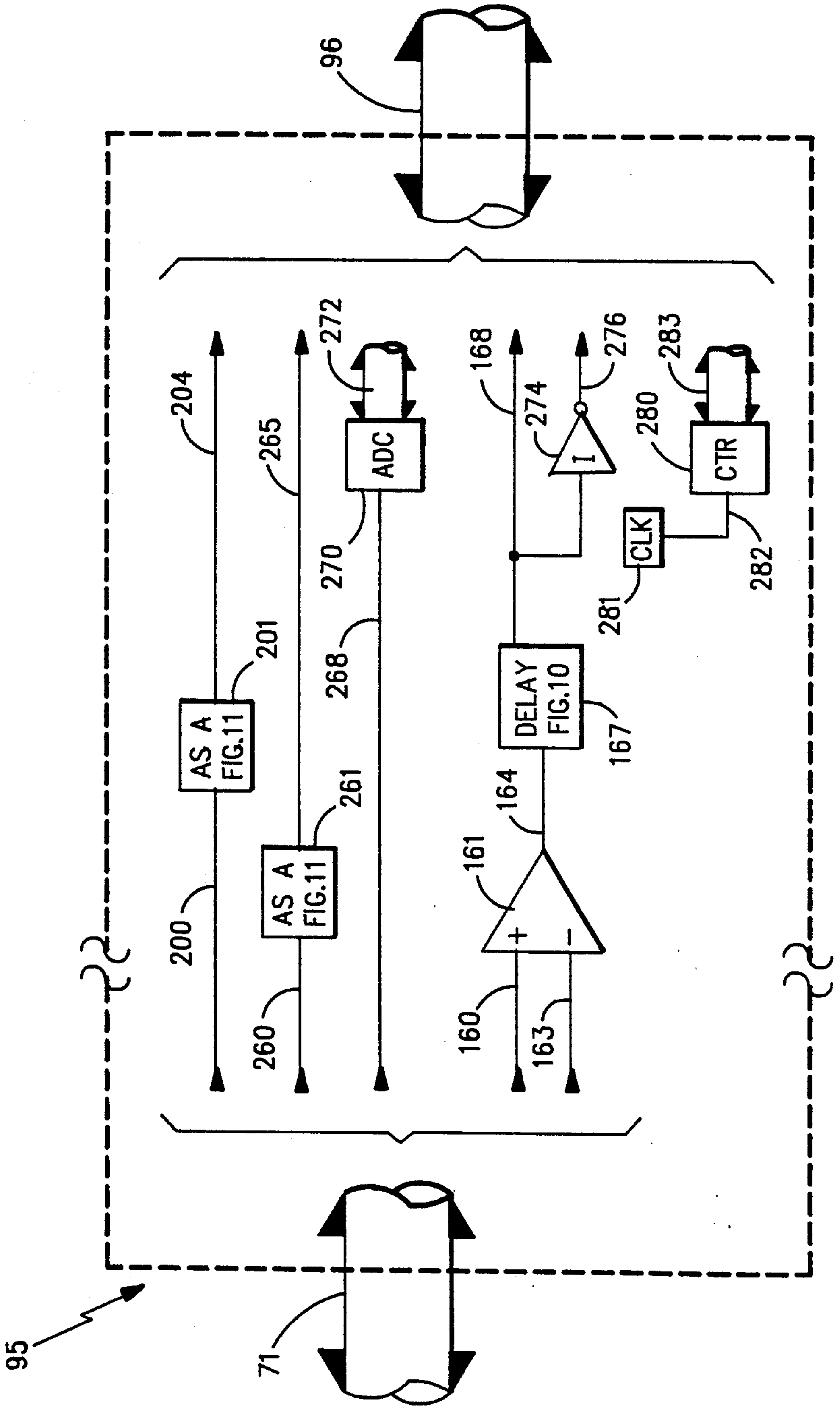
FIG. 8 is a detailed block diagram of a portion of the selected elements of FIG. 4.
Figure 8B:
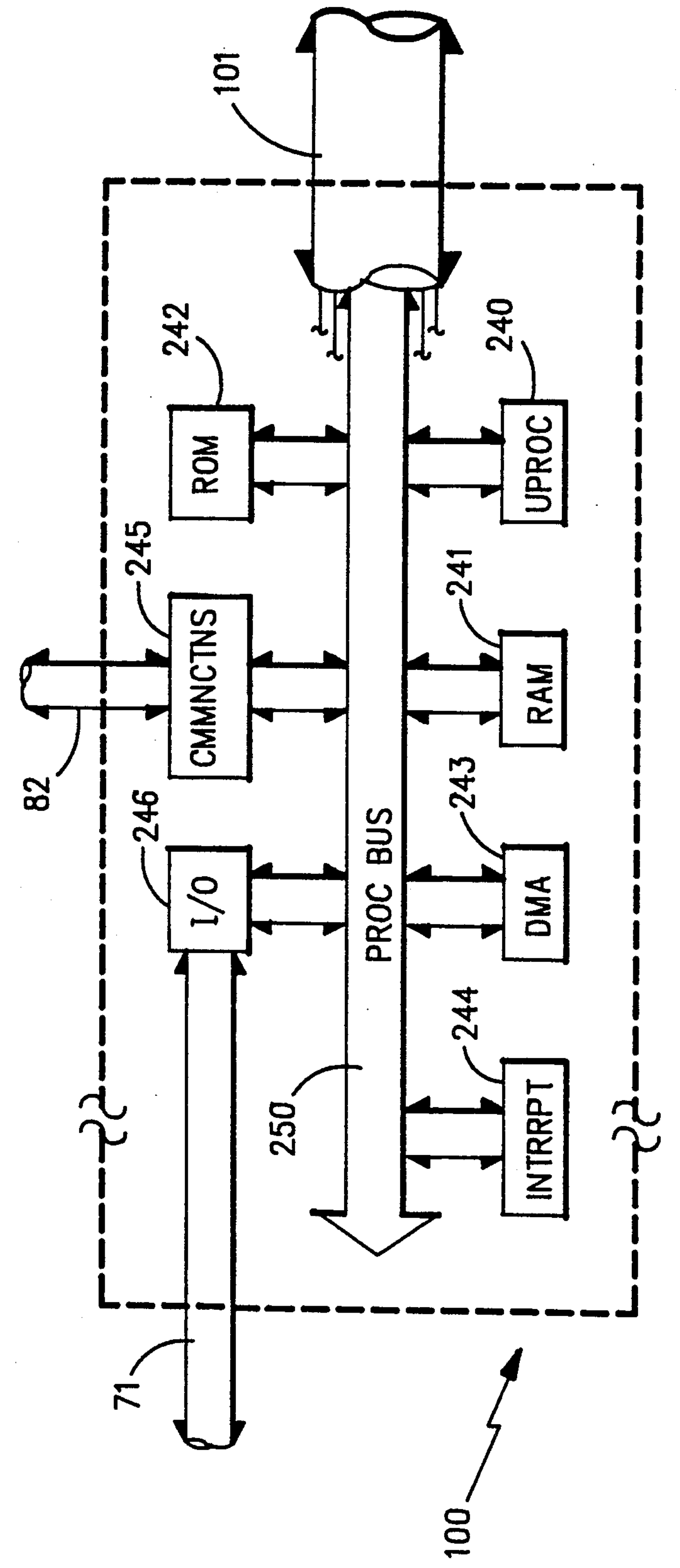

Referring to FIG. 3, the DAU 18 includes known type, analog signal processing (ASP) circuitry 95 (described in more detail hereinafter with respect to FIG. 8, illustration (a)). The ASP circuitry 95 performs analog to digital conversion on the predominantly analog-type, sensed engine signals. The converted signals are further processed by other portions of the DAU and CIU computer 12. The ASP circuitry connects by signal lines 96 to a DAU system bus 97, which may be a known bus architecture, e.g., the Multibus standard.

The DAU also includes digital signal processing (DSP) circuitry 98 for data reduction and adaptive filtering. The DSP circuitry 98 connects by signal lines 99 to the DAU system bus. Also, the DAU contains processor circuitry 100 (described in more detail hereinafter with respect to FIG. 8, illustration (b)) that processes signals for use by other portions of the equipment 10, including the ASP circuitry, DSP circuitry, boom 22 and the CIU computer 12. The processor circuitry connects to the DAU system bus by signal lines 101.

Figure 4:
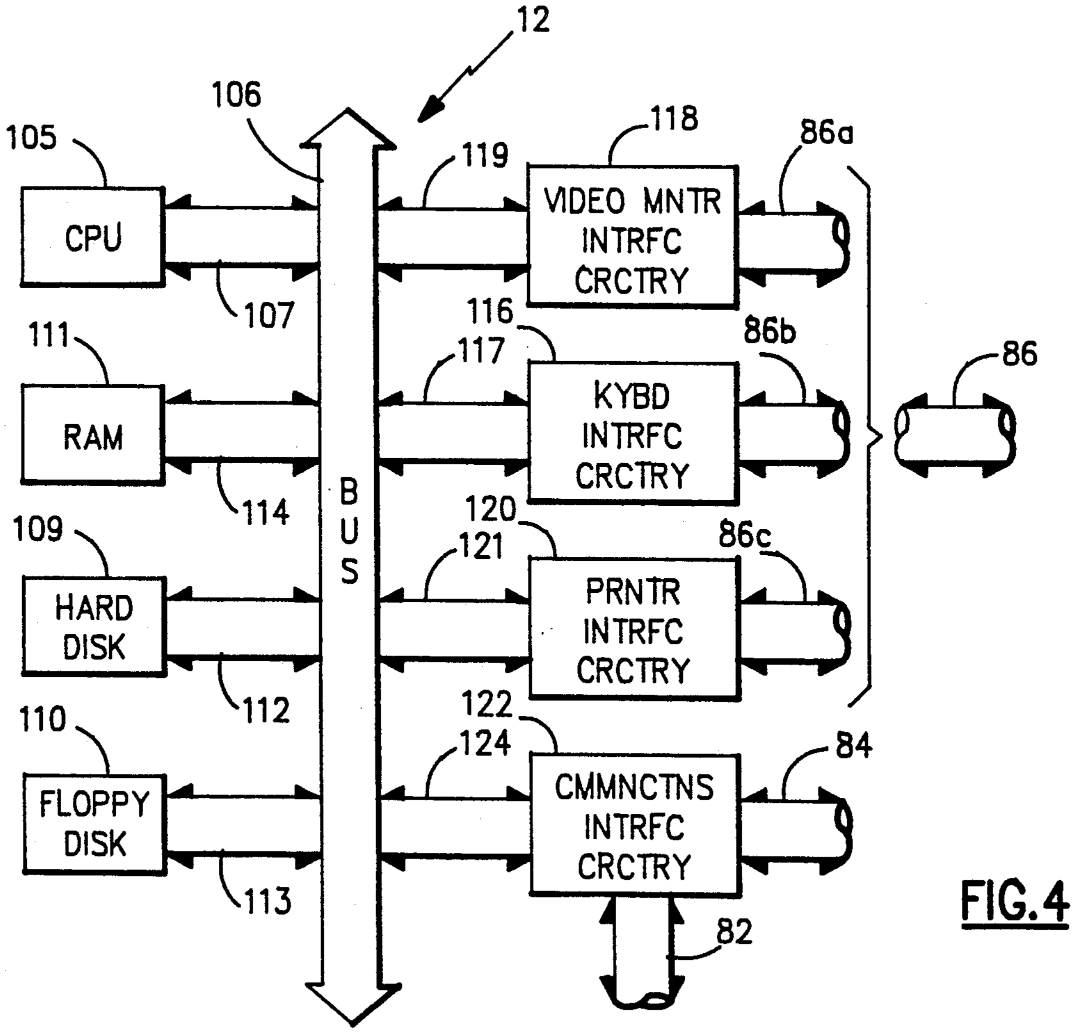
FIG. 4 is a block diagram of further selected elements of the automotive diagnostic system of FIG. 2.

Referring to FIG. 4, the CIU computer 12 comprises a known microcomputer system, such as an International Business Machines (IBM) Corporation Model AT computer. The CIU computer contains the hardware and software necessary to interface with all elements of the equipment 10. The CIU computer includes a central processing unit (CPU) 105 connected to a CIU bus 106 by signal lines 107. The CIU bus 106 includes address, data and control lines.

The CIU computer provides data storage devices, including a hard disk drive 109, one or more floppy disk drives 110, and random access memory (RAM) 111. The hard disk 109, typically 40 megabyte (MB) capacity, stores the known operating system (e.g., MS-DOS) and vehicle test software as well as the operating software for the DAU processor circuitry 100. The hard disk connects to the CIU bus by signal lines 112.

The floppy disk 110 loads software on the hard disk and typically comprises the known 3.5 inch, 1.44 MB format. The floppy disk connects to the CIU bus by signal lines 113. The RAM 111 stores program-dependent operating parameters and is comprised of integrated circuit (IC) components totalling 640 kilobytes (KB) or more of memory capacity. The RAM connects to the CIU bus by signal lines 114.

The CIU computer controls the operation of the video monitor 14, printer 15, and keyboard 16. The keyboard is the primary user input device to the CIU computer and provides a full alphanumeric character set. The CIU computer includes keyboard interface circuitry 116 that connects to the CIU bus by signal lines 117. The monitor, typically a high-resolution monitor comprising a Model 1019/SP from Microvitec Corp., is used for display of vehicle test procedures and results. The CIU computer includes monitor interface circuitry 118 that connects to the CIU bus by signal lines 119. The printer, typically a medium-speed dot matrix impact printer comprising a Model LQ-850 from Epson Corp., is used for printing vehicle test results. The CIU computer includes printer interface circuitry 120 that connects to the CIU bus by signal lines 121.

The CIU computer also includes communications interface circuitry 122 that implements the DAU link 82 and the CEA link 84. The DAU link provides for communication of DAU-processed engine signals and DAU processor software stored on the hard disk 109. The CEA link provides for communication of CEA-processed exhaust signals. The communications interface circuitry 122 connects to the CIU bus by signal lines 123.

In a typical automobile diagnostic and repair procedure, the operator connects the desired engine probes 25–36 and/or exhaust probe 21 to the vehicle under test. The operator then determines vehicle performance by instructing the equipment to execute diagnostic tests. The particular tests chosen are selected from a menu displayed on the monitor. The equipment 10 also provides probe hookup information for each test. Test operation proceeds and the resulting test data is displayed on the monitor for interpretation. The operator can also print out a hard copy of the test results on the printer. The tests include:

cranking: cranking the engine and preventing start-up allows the starting and engine mechanical systems to be diagnosed. Test results are obtained by energizing the starter motor for fifteen seconds and inhibiting engine start-up through suppression of the primary ignition system.

relative compression: measures the starter current draw from the battery during each cylinder's compression stroke and compares each cylinder relative to one another.

charging: measures alternator voltage and amperes outputs during a ten-second period. The cranking test is normally performed just prior to this test so as to discharge the battery during the cranking period, thus creating full alternator output demand.

running: provides general diagnostic information at any engine speed. Information provided includes engine speed, battery voltage, battery current, dwell, vacuum and timing.

primary voltage: measures the induced voltage in the primary circuit at the beginning of secondary circuit discharge.

secondary ignition: measures spark plug firing voltage amplitude and duration.

dwell per cylinder: measures the pulse width in degrees of rotation of the dwell portion of the ignition signal in the primary ignition circuit.

cylinder balance: measures the power output of each cylinder by defeating the ignition of one cylinder at a time and measuring the RPM drop of the engine. The RPM drop of each cylinder is compared to one another to provide a relative indication of power balance.

fuel distribution: sequentially defeats each cylinder and measures the emissions change in order to verify that each cylinder is receiving approximately the same air/fuel mixture in the correct proportion, and also measures the power balance of each cylinder similar to the cylinder balance test.

RPM/vacuum: measures engine RPM and intake manifold vacuum when testing for catalytic converter restrictions or verifying proper air/fuel flow into the engine.

selective cylinder defeat: similar to the auto cylinder balance test; however, it allows selected cylinders or more than one cylinder at a time to be defeated. This test is used for carburetor balance testing.

battery load: measures engine RPM, battery voltage, and battery current while allowing the engine to crank, but not start, for twenty seconds. This test is designed to verify if the battery is capable of maintaining sufficient voltage under load in order to deliver sufficient current to the starter motor.

The equipment also provides digital scope capability for measurement and display of engine parameters in real time. Selected parameters include primary ignition, secondary ignition, and alternator ripple.

The description thus far is of equipment that aids an operator in the diagnosis and repair of automobiles. The present invention may be used in such equipment, as described in detail hereinafter. The use of the present invention in such equipment represents the best mode for carrying out the invention. However, it is to be understood that the invention may be implemented in simpler equipment which includes only the sensing, signal processing, and display means required for direct support of the invention.

As part of a typical automobile diagnostic and repair procedure, the operator performs an engine timing advance test. In this test, engine speed is incrementally increased from a predetermined value. At each increment, sensing means provides signals indicative of the actual values of a number of vehicle parameters, and the equipment calculates, from the sensed vehicle parameters, vehicle performance value signals corresponding to selected vehicle performance criteria (timing, vacuum and dwell). In proper operation of the engine timing advance on a point-type vehicle ignition system, the vacuum and timing performance criteria both increase in value with increasing RPM, while average dwell remains relatively constant over the RPM range. (Average dwell is the dwell of each cylinder added together and divided by the number of engine cylinders on the vehicle under test).

Figure 5:
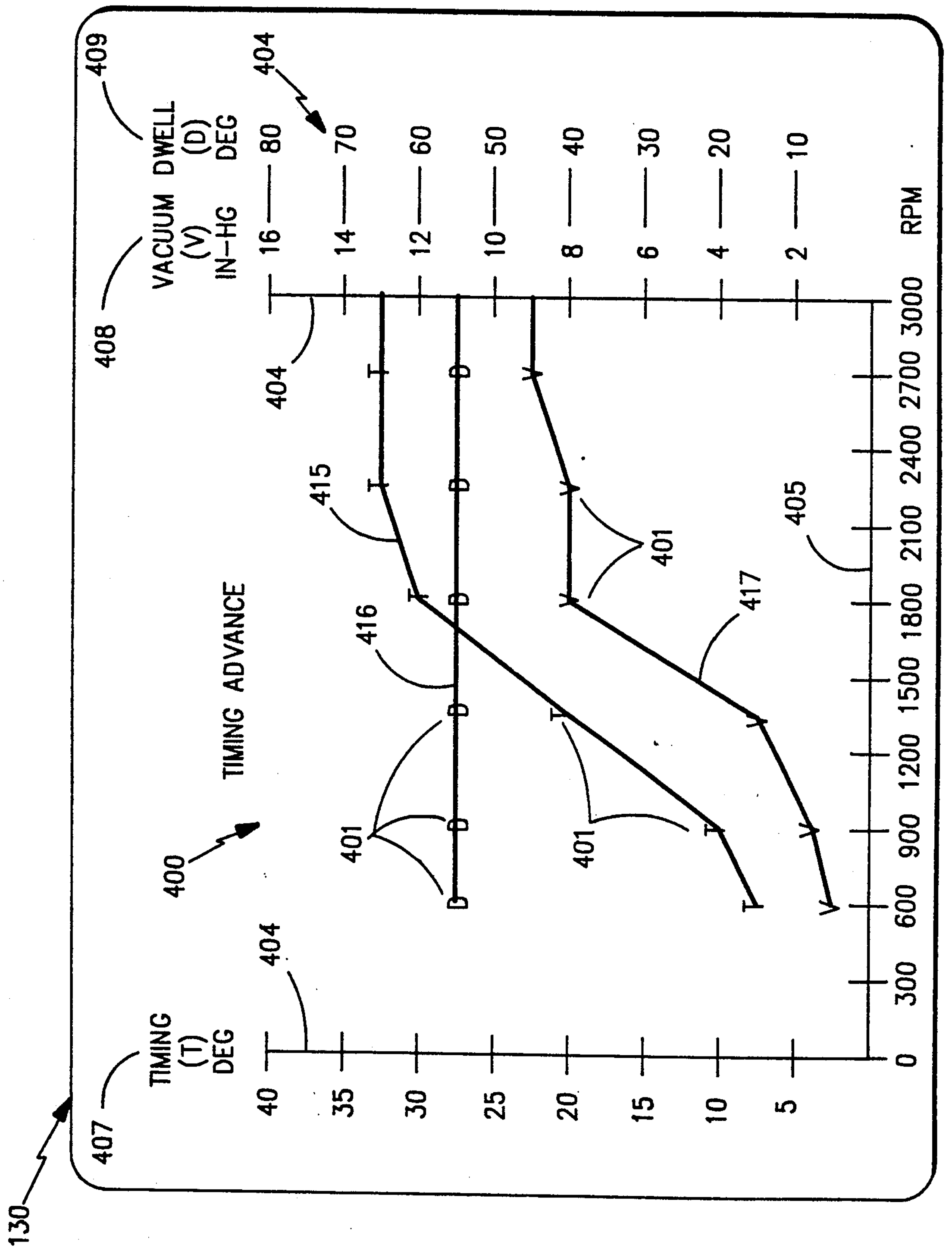
FIG. 5 is an illustration of a screen display of engine timing advance data in accordance with the present invention.
Figure 6A:
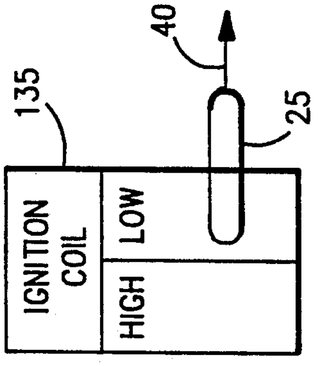
FIGS. 6A–6E are illustrations of the connection of selected engine probes to a vehicle under test.
Figure 6B:
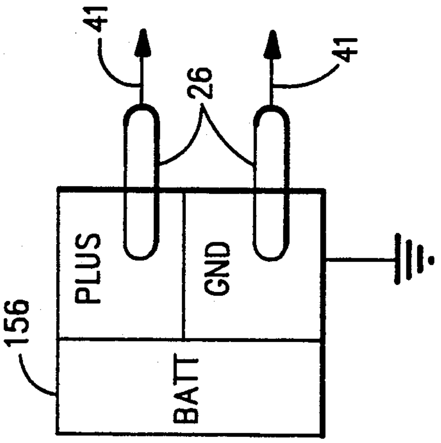
Figure 6C:
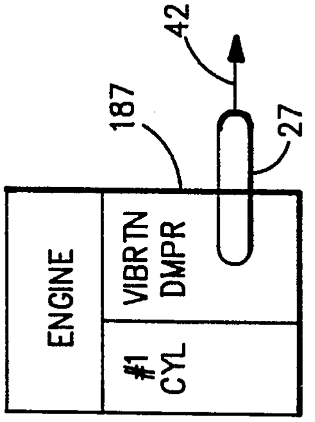
Figure 6D:
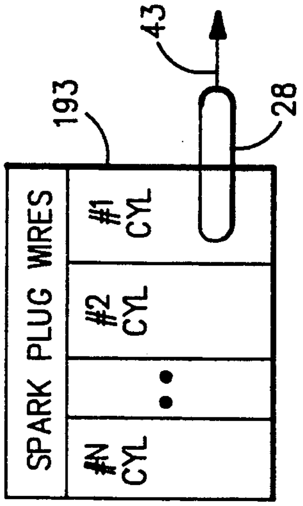
Figure 6E:
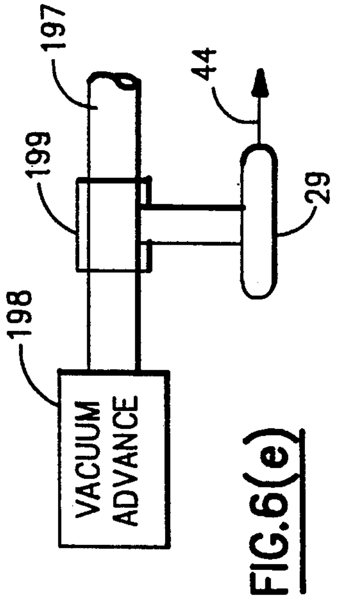

In determining overall engine timing advance performance, the operator is required to observe the trend of the calculated performance value signals. In the modern prior art of vehicle engine testing equipment, it is known to display the timing advance data numerically. However, in order to reduce operator data interpretation time and, thus, improve operator productivity, it is desired to graphically display the data on a display screen. FIG. 5 illustrates a graphic display screen 130 of timing advance data in accordance with the present invention. The display screen 130 is described in greater detail hereinafter with respect to an exemplary timing advance test.

Figure 7:
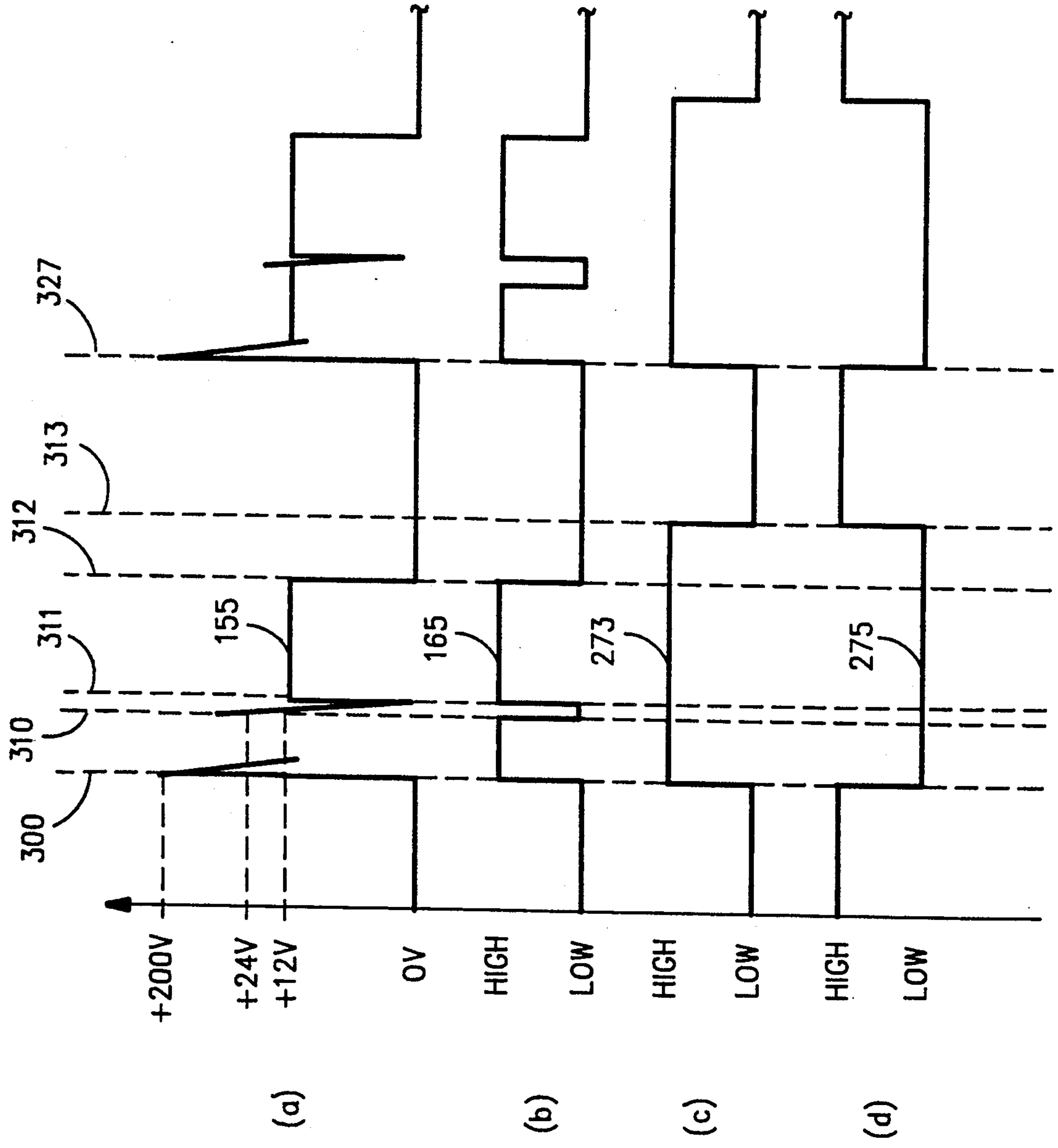
FIG. 7 illustrates an exemplary ignition coil primary signal waveform as may be found in a vehicle under test, and corresponding signal waveforms found in the automotive diagnostic system of FIG. 2.

Referring to FIG. 6 and again to FIG. 2, the timing advance test requires the operator to connect the low coil probe 25 to the primary (low voltage) side of the vehicle ignition coil 135 (FIG. 6, illustration (a)). The sensed low coil voltage signal (waveform 155 of FIG. 7, illustration (a)) is provided on the line 40 to the connector 55 in the boom 22. The sensed signal is then presented on one of the lines 69 to the signal conditioning circuitry 70, which presents the conditioned signal on one of the lines 71 to the DAU 18.

The operator also connects the battery leads 26 to the vehicle battery 156. The sensed battery voltage signal (typically +12 VDC) is provided on the lines 41 to the connector 56. The signal conditioning circuitry includes a known resistor divider network (not shown) that reduces the +12 VDC signal to +8 VDC and presents this signal on one of the lines 71 to the DAU.

FIG. 8, illustration (a), illustrates a portion of the DAU ASP circuitry 95. The conditioned low coil signal is presented on a line 160 to an input of a known type comparator 161. The +8 VDC battery signal is presented on a line 163 to a second input of the comparator 161. The output of the comparator on a line 164 (waveform 165 of FIG. 7, illustration (b)) is high when the conditioned low coil signal is at a greater voltage level than the +8 VDC battery signal. Conversely, the comparator output is low when the conditioned low coil signal is less than the +8 VDC battery signal.

The comparator output on the line 164 is presented to a delay circuit 167 that provides an output on a line 168. The delay circuit output line 168 is high when the comparator output is high, while the delay circuit output line is low only when the comparator output is low for approximately one millisecond (ms).

Figure 10:
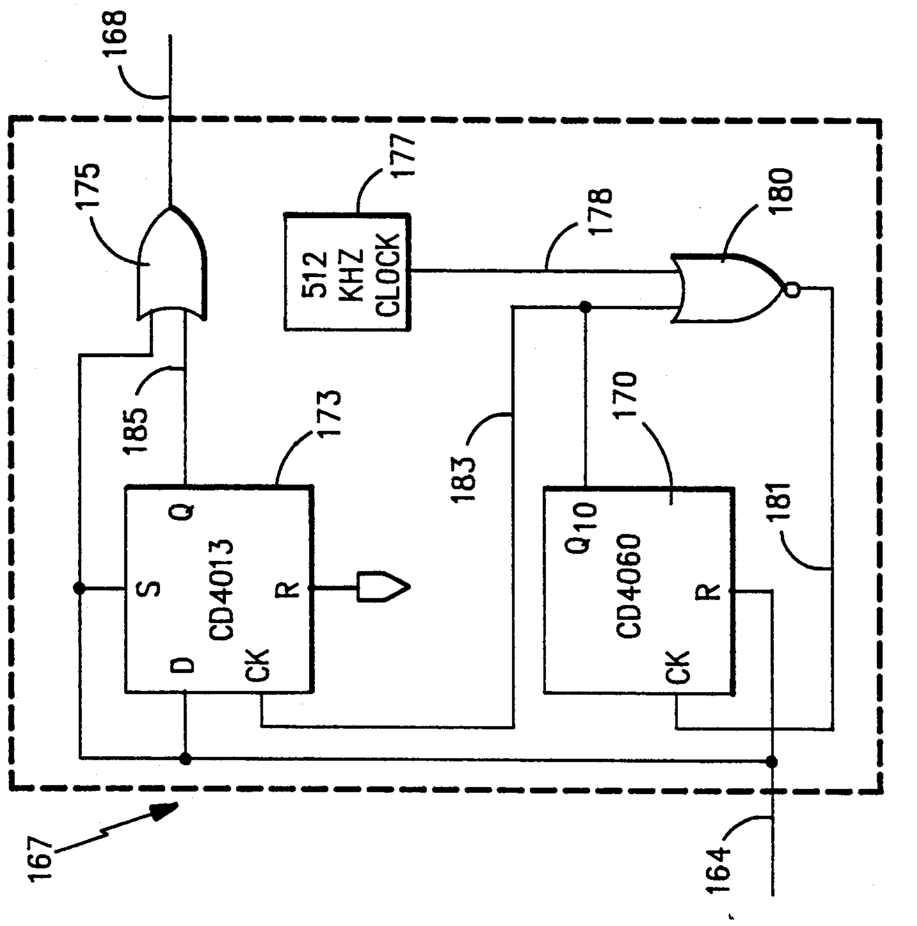
FIGS. 10 and !1 are detailed block diagrams of portions of the selected elements of FIG. 8.

FIG. 10 illustrates the delay circuit 167 in greater detail. The comparator output on the line 164 is presented to a reset input of a known 14-stage, ripple-carry binary counter 170 (National Semiconductor CD4060). The comparator output is also presented to both D and set (S) inputs of a known D-type flip-flop 173 (National Semiconductor CD4013), and to an input of an OR gate 175. A clock generator 177 provides pulses at a frequency of 512 KHZ on a line 178 to an input of a NOR gate 180, the output of which is presented on a line 181 to a clock input of the binary counter 170. The tenth-stage output (Q10) of the binary counter is presented on a line 183 to both a second input of the NOR gate 180 and to a clock input of the flip-flop 173. The Q output of the flip-flop is presented on a line 185 to a second input of the OR gate 175. The reset input of the flip-flop is connected to 0 VDC (ground). The output of the OR gate 175 comprises the delay circuit output on the line 168.

In operation, whenever the comparator output is high, the OR gate output is high. When the comparator output goes low, the binary counter is reset to zero which makes the Q10 output low. The low Q10 output inhibits the flip-flop from clocking the low comparator output on the D input to the Q output. If the comparator output remains low for approximately one ms, the binary counter will have counted enough 512 KHZ pulses so that the Q10 output goes high after one ms. The high QIO output clocks the low D input to the Q output and subsequently to the output of the OR gate. However, if the comparator output goes high before one ms has expired since it went low, then the OR gate output remains high. Thus the delay circuit only provides a low output on the line whenever the comparator output is low for at least one ms.

Figure 9:
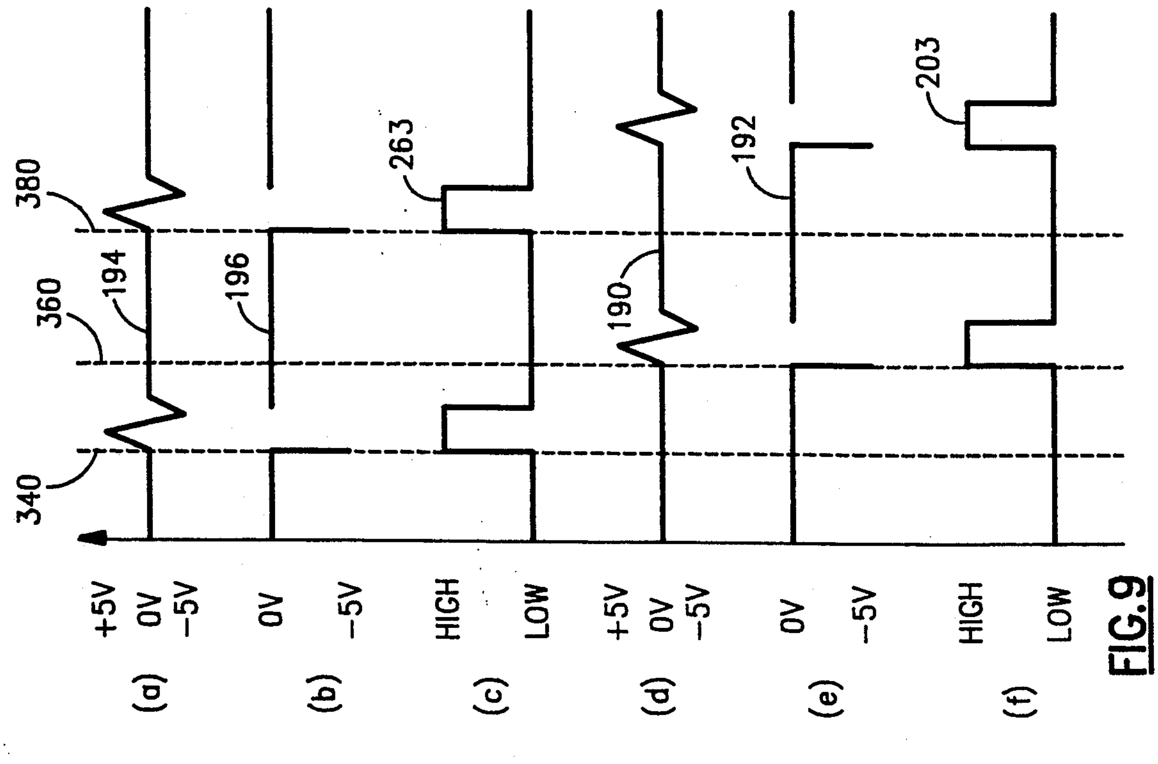
FIG. 9 illustrates exemplary ignition system waveforms as may be found in a vehicle under test, and corresponding signal waveforms found in the automotive diagnostic system of FIG. 2.

Referring again to FIGS. 2 and 6, the timing advance test requires the operator to connect the TDC probe 27, the inductive pickup probe 28, and the vacuum probe 29 to the engine. The TDC probe is a magnetic pickup device that is inserted into a collar on the engine in proximity to the vibration damper 187 (FIG. 6, illustration (c)). The TDC probe senses when the #1 engine cylinder is at the top of its compression stroke and presents this signal (waveform 190 of FIG. 9, illustration (d)) to the connector 57. The signal conditioning circuitry 70 removes the positive voltage component of the signal using known rectification components (not shown). The conditioned TDC signal (waveform 192 of FIG. 9, illustration (e)) is presented on one of the lines 71 to the DAU 18.

The inductive pickup probe 28 connects to the #1 cylinder spark plug wire 193 (FIG. 6, illustration (d)). The probe senses each time the #1 spark plug fires and presents this signal (waveform 194 of FIG. 9, illustration (a)) on the line 43 to the connector 58. The signal conditioning circuitry removes the positive voltage component of the signal using known rectification components (not shown). The conditioned #1 cylinder signal (waveform 196 of FIG. 9, illustration (b)) is presented on one of the lines 71 to the DAU 18.

The vacuum probe 29 is connected by splicing into the vacuum hose 197 on the vacuum advance 198 with a T-type connector 199 (FIG. 6, illustration (e)). The sensed vacuum signal, which is presented on a line 44 to the connector 59, represents the amount of intake manifold vacuum. The signal conditioning circuitry buffers the sensed vacuum signal using a known type buffer circuit (not shown), and presents the conditioned signal on one of the lines 71 to the DAU 18.

Referring to FIG. 8, illustration (a), the conditioned TDC signal is presented on a line 200 to a known type, first adaptive sense amplifier 201 (ASA). The ASA 201 converts the conditioned TDC signal (FIG. 9, illustration (e)) to a corresponding TTL voltage level signal (waveform 203 of FIG. 9, illustration (f)), and presents this signal on a line 204.

Figure 11:
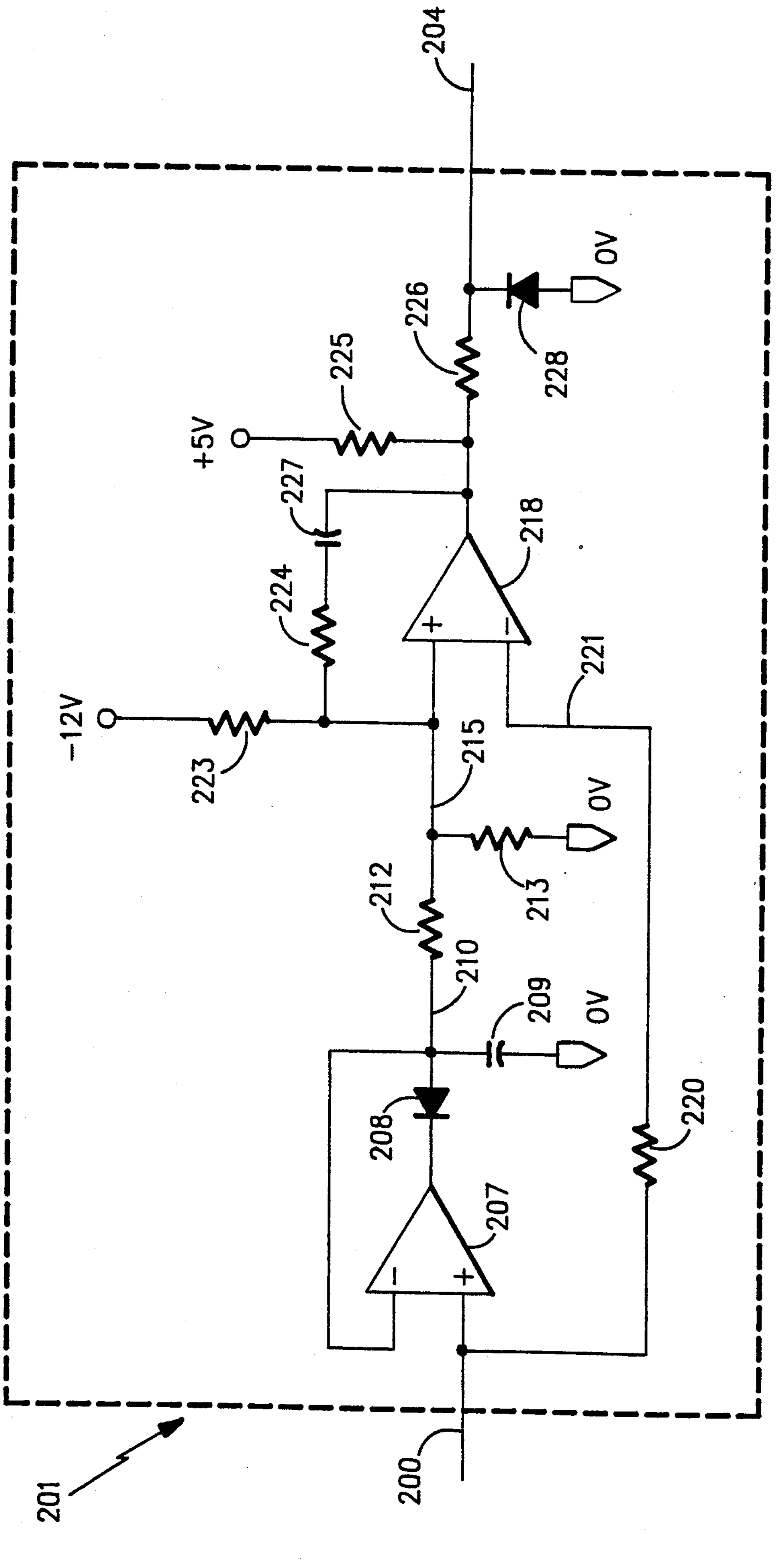

FIG. 11 is a detailed illustration of the first ASA 201. The conditioned TDC signal on the line 200 is presented to an input of a known type, operational amplifier 207 (OP AMP). The OP AMP 207 together with diode 208 and capacitor 209 are arranged as a negative peak detector that provides a signal on a line 210 indicative of the peak negative DC voltage value of the conditioned TDC signal. The peak signal is presented to a resistor divider network comprised of two known type resistors 212,213. The output of the resistor divider network is provided on a line 215 to a plus (+) input of a second OP AMP 218. The conditioned TDC signal is presented through a resistor 220 on a line 221 to a negative (−) input of the second OP AMP 218. The second OP AMP together with resistors 223–226, capacitor 227, and diode 228 are arranged to present a high TTL voltage signal on the first ASA output line 204 whenever the plus OP AMP input is at a higher DC voltage than the negative OP AMP input. Conversely, a low TTL voltage signal is provided on the first ASA output line when the negative input is at a lower DC voltage than the plus input. In operation, the first ASA output on the line is high during the time when the conditioned TDC signal at the ASA input is at a negative DC voltage value. The first ASA output signal line 204 connects to the DAU processor circuitry 100 (FIG. 8, illustration (b)) through signal lines 96,101 and DAU system bus 97.

The DAU processor circuitry 100 (FIG. 8, illustration (b)) includes a known type microprocessor 240 (UPROC) (e.g., an INTEL Corporation Model 80186) as the central processing unit. The processor circuitry also includes a number of UPROC support components, such as random access memory 241 (RAM), read only memory 242 (ROM), direct memory access 243 (DMA), interrupt controller 244 (INTRRPT), communications (CMMNCTNS) interface 245, and input/output (I/0) interface 246. These components communicate with each other and the signal lines 101 and DAU system bus 97 by a processor bus 250 comprising address, data and control lines.

The RAM 241 stores data operated on by the UPROC 240 and comprises known MOS-type ICs. The ROM 242 comprises nonvolatile storage for both program parameters and UPROC-executable software. The communications interface 245 implements the SCSI link 82 to the CIU computer 12. The I/0 interface 246 communicates data on the lines 71 to the boom 22. The DMA 243 transfers data directly from the I/0 interface to RAM without UPROC intervention. The interrupt controller 244, typically an INTEL Corporation Model 8259, determines the UPROC interrupt priority from among a number of signals connected to the interrupt controller inputs. The output of the interrupt controller is connected to an interrupt input on the UPROC.

Referring also to FIG. 8, illustration (a), the first ASA output signal on the line 204 connects to an input of the interrupt controller, which interrupts normal UPROC program operation each time the TDC probe 27 senses that the #1 engine cylinder is at the top of its compression stroke. The sequence of steps that the UPROC executes upon the occurrence of the TDC interrupt is described in more detail hereinafter with respect to an exemplary timing advance test.

The conditioned #1 cylinder signal (FIG. 9, illustration (b)) is presented on a line 260 to a second ASA 261 (FIG. 11), which converts the signal to a corresponding TTL signal (waveform 263 of FIG. 9, illustration (c)). The output signal on a line 265 from the second ASA is presented to an input of the interrupt controller which interrupts normal UPROC program operation each time the inductive pickup 28 senses a firing of the #1 cylinder spark plug. The sequence of steps that the UPROC executes upon the occurrence of the #1 cylinder interrupt is described in more detail hereinafter with respect to an exemplary timing advance test.

The conditioned vacuum signal is presented on a line 268 to an input of a known type, analog to digital converter 270 (ADC). The ADC converts the sensed vacuum signal to a multiple-bit digital number and presents this number at the ADC output on signal lines 272 that connect to the DAU system bus 97. UPROC processing of the ADC output is described in more detail hereinafter with respect to an exemplary timing advance test.

The output of the delay circuit on the line 168 (waveform 273 of FIG. 7, illustration (c)) is presented to an inverter 274, whose output (waveform 275 of FIG. 7, illustration (d)) is presented on a line 276. Both output lines 168,276 connect through the DAU system bus to inputs on the interrupt controller. The sequence of steps that the UPROC executes upon the occurrence of each interrupt is described in more detail hereinafter with respect to an exemplary timing advance test.

The DAU ASP circuitry 95 includes a counter (CTR) circuit 280, typically an INTEL Corporation Model 8254, and a clock generator 281 (CLK) that provides 35 KHZ pulses on a line 282 to a CTR input. The CTR 280 contains two internal registers that, when triggered, count the 35 KHZ input pulses. The CTR communicates with the DAU processor circuitry 100 through signal lines 283 connected to the DAU system bus. The UPROC 240 transmits data words to the CTR to start and stop the counting of the 35 KHZ pulses.

The operation of the equipment 10 in performing the timing advance test is best understood by example. The operator selects the timing advance test from a menu of diagnostic tests (described hereinbefore) displayed on the video monitor 14. The operator then connects the appropriate engine probes and runs the vehicle at idle engine speed.

Referring to FIG. 7, at time 300, the low coil probe 25 senses when the primary side of the ignition coil initiates the firing of a spark plug. The low coil signal is greater than the +8 VDC battery signal; thus, the comparator output is high, the delay circuit output is high, and the inverter output is low. The high delay circuit output at time 300 interrupts the UPROC, which then executes the algorithmic subroutine of FIG. 12.

Figure 12:
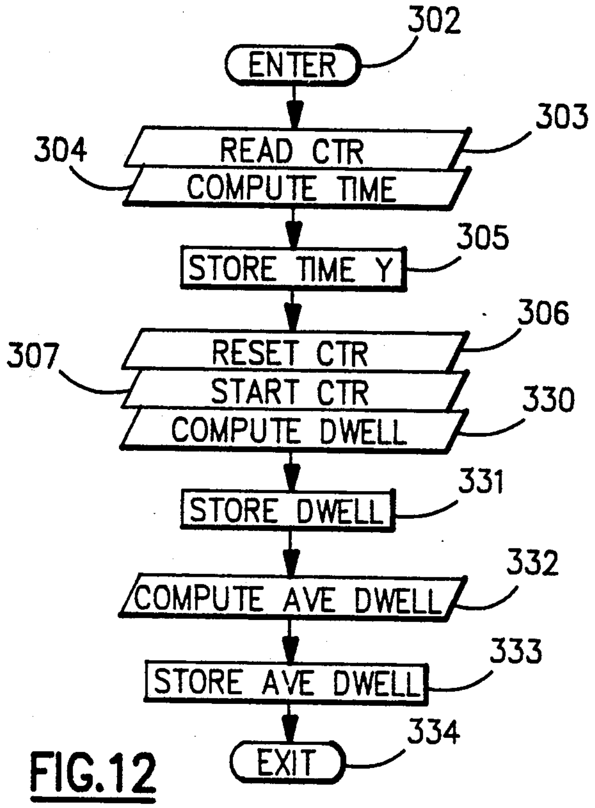
FIGS. 12 and 13 are flowchart diagrams used in the present invention for calculating engine dwell.

In FIG. 12, after an enter step 302, the UPROC reads, in a routine 303, the value of the CTR register that contains the number of 35 KHZ clock pulses since the last occurrence of the low coil interrupt. The UPROC then calculates, in a routine 304, the time since the last occurrence of the low coil interrupt by multiplying the number of pulses in the CTR register by the time period of a single 35 KHZ pulse. In step 305, the UPROC stores this time in RAM 241 as time "Y". The UPROC then resets the CTR in a routine 306 and, in a routine 307, starts the CTR counting 35 KHZ pulses. The remainder of the subroutine of FIG. 12 is described hereinafter.

Returning to FIG. 7, between times 300–310, the sensed low coil signal is at +24 VDC (FIG. 7, illustration (a)). At time 310, the low coil signal momentarily spikes towards 0 VDC. Thus, the +8 VDC battery signal is greater than the low coil signal and the comparator output goes low. However, the momentary spike is less than one millisecond in duration, and the low coil signal at the end of the spike (time 311) is +12 VDC; therefore, the delay circuit output remains high during and immediately after the spike.

At time 312, the low coil signal transitions to 0 VDC which indicates the closing of the ignition points and the beginning of the dwell time. The comparator output goes low at time 312 since the +8 VDC battery signal is greater than the low coil signal. However, the delay circuit output remains high for one millisecond until time 313, when the delay circuit output goes low and the inverter output goes high The high inverter output interrupts the UPROC which executes the algorithmic subroutine of FIG. 13.

Figure 13:
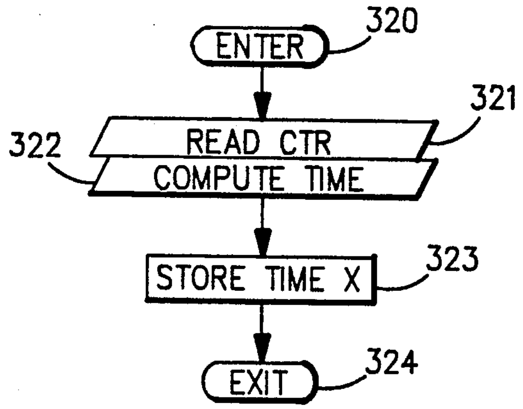

In FIG. 13, after an enter step 320, the UPROC reads, in a routine 321, the value of the CTR register that contains the number of 35 KHZ clock pulses since the last occurrence of the low coil interrupt. The UPROC then calculates, in a routine 322, the time since the last occurrence of the low coil interrupt by multiplying the number of pulses in the CTR register by the time period of a single 35 KHZ pulse. In step 323, the UPROC stores this time in RAM as time "X". The subroutine then exits in a step 324.

The low coil signal remains at 0 VDC until time 327 when the low coil signal transitions to +24 VDC after a momentary voltage spike of +200 VDC. The sequence of events following time are similar to those at time described hereinbefore (i.e., the UPROC executes the subroutine of FIG. 12). In FIG. 12, after the UPROC restarts the CTR in the routine 307, the UPROC then calculates, in a routine 330, the dwell, in degrees, for the most recent cylinder spark plug firing (i.e., between times 300–327) using the following equation: DWELL =((Y−X−1 MSEC) / Y) * (360 DEG / #OF CYL)

where Y and X are the times stored in RAM in the subroutines of FIGS. 12 and 13 respectively. The UPROC stores the calculated dwell in RAM in a step 331. The UpROC then calculates, in a routine 332, the average dwell by adding together the dwell computed in the routine the last Q times the subroutine of FIG. 12 was executed, and dividing this number by the number of engine cylinders, Q. The UPROC stores the average dwell in RAM in a step 333. The subroutine then exits in a step 334.

Referring to FIG. 9, at time 340, the inductive pickup probe senses the firing of the #1 cylinder spark plug (FIG. 9, illustration (a)). The conditioned #1 cylinder signal (FIG. 9, illustration (b)) is presented to the first ASA 200 whose output (FIG. 9, illustration (c)) on the line 204 goes high at time 340, thus interrupting the UPROC 240. The UPROC then executes the algorithmic subroutine of FIG. 14.

Figure 14:
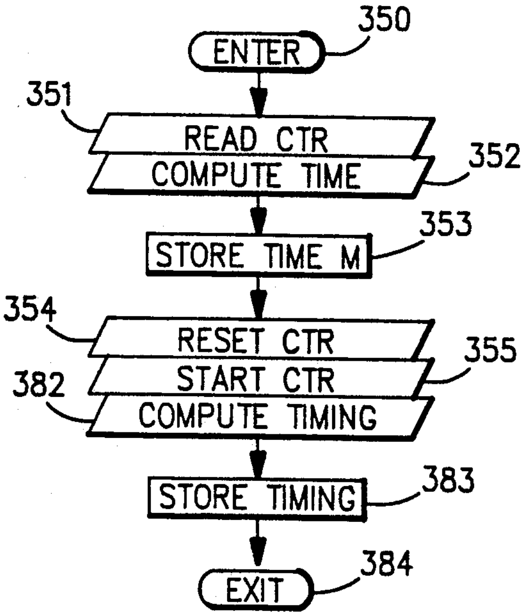
FIGS. 14 and 15 are flowchart diagrams used in the present invention for calculating engine timing.

In FIG. 14, after an enter step 350, the UPROC reads, in a routine 351, the value of an internal register in the CTR that contains the number of 35 KHZ clock pulses since the last occurrence of the #1 cylinder interrupt. The UPROC then calculates, in a routine 352, the time since the last occurrence of the #1 cylinder interrupt by multiplying the number of pulses in the CTR register by the time period of a single 35 KHZ pulse. In step 353, the UPROC stores this time in RAM as time "M". The UPROC then resets the CTR in a routine 354 and, in a routine 355, starts the CTR counting 35 KHZ pulses. The remainder of the subroutine is described in detail hereinafter.

Referring again to FIG. 9, at time 360, the TDC probe senses that the #1 cylinder is at the top of its compression stroke (FIG. 9, illustration (d)). The conditioned TDC signal (FIG. 9, illustration (e)) is presented to the second ASA 261, whose output (FIG. 9, illustration (f)) goes high at time 360, thus interrupting the UPROC. The UPROC then executes the algorithmic subroutine of FIG. 15.

Figure 15:
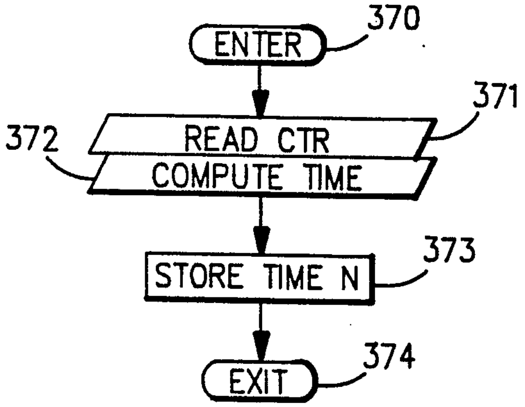

In FIG. 15, after an enter step 370, the UPROC reads, in a routine 371, the value of the CTR register that contains the number of 35 KHZ clock pulses since the last occurrence of the #1 cylinder interrupt. The UPROC then calculates, in a routine 372, the time since the last occurrence of the #1 cylinder interrupt by multiplying the number of pulses in the CTR register by the time period of a single 35 KHZ pulse. In step 373, the UPROC stores this time in RAM as time "N". The subroutine then exits in a step 374.

Upon the next occurrence of a #1 cylinder interrupt at time 380, the UPROC again executes the subroutine of FIG. 14. After the UPROC restarts the CTR counting the 35 KHZ pulses in the routine 355, the UPROC then calculates, in a routine 382, the timing in degrees using the following equation:

$$\text{TIMING} = (N / M) * 720 \text{ DEG}$$

where M and N are the times stored in RAM in the subroutines of FIGS. 14 and 15 respectively. The UPROC stores the calculated timing in RAM in a step 383. The subroutine then exits in a step 384.

The #1 cylinder interrupt of FIG. 9, illustration (c) is also used to calculate the engine speed in RPM. The time "M" computed and stored in RAM in the subroutine of FIG. 14 can be used to calculate the engine RPM for a four cycle engine using the following equation:

$$\text{RPM} = (1/M) * 2 \text{ (revs per \#1 cyl)} * 60 \text{ (sec per min)}$$

This calculation of engine speed can be performed as part of the subroutine of FIG. 14.

The digital output of the ADC 270 on the signal lines 272 is read by the UPROC 240 twice per second as part of a simple algorithmic subroutine (not shown) which utilizes the digital output as an index into a table, stored in RAM 241, of intake manifold vacuum values. The resulting table output is then the output of the vacuum algorithmic subroutine that ultimately gets displayed on the video monitor 14.

In the engine timing advance test, the operator runs the automobile at idle for several seconds to allow the equipment 10 to sense the parameters (low coil, TDC, etc.) and calculate the values for timing, vacuum, average dwell, and engine speed. The operator then increases the engine speed and the equipment does the necessary sensing and calculation as described hereinbefore. The engine speed is incrementally increased until the operator has enough data (displayed graphically as per FIG. 5) to make a determination as to the operability of the engine timing advance. It is anticipated that parameter values will be sensed at approximately six to eight different engine speeds; thus the entire test executes in roughly ten to fifteen seconds.

Periodically (e.g., once per second) throughout the timing advance test, the DAU processor circuitry 100 communicates the current calculated values for timing, vacuum, average dwell, and engine speed over the CIU link 82 to the CIU computer 12. The CIU computer processes the data using known software techniques for display on the video monitor 14 in accordance with the present invention.

Referring to FIG. 5, a display screen 130 of the monitor is illustrated as comprising, in accordance with the present invention, a graph 400 of the calculated timing, vacuum, and average dwell vehicle performance value signals. The value of each calculated signal is plotted as points 401 in a rectangular coordinate system display format with respect to a scaled ordinate axis 404 and a scaled abscissa axis 405. The scaled abscissa 405 is indicative of engine speed in RPM ranging from zero RPM to a predetermined maximum value (3000 RPM), with 300 RPM increments therebetween. The scaled ordinate 404 is labeled in corresponding columns 407–409 with the units of the corresponding calculated performance value signals. That is, the timing ordinate column 407 is labeled in degrees (DEG) ranging from 0 at the abscissa to a maximum of 40, with 5 degree increments therebetween. Similarly, the vacuum ordinate column 408 is labeled in inches of mercury (IN-HG) ranging from 0 at the abscissa to a maximum of 16, with 2 IN-HG increments therebetween. The dwell ordinate column 409 is labeled in degrees ranging from 0 at the abscissa to a maximum of 80, with 10 degree increments therebetween.

The plotted points 401 for each of the selected vehicle performance criteria are labeled with an alphanumeric character in further accord with the present invention. That is, each timing point is labeled with a "T" character, each dwell point is labeled with a "D" character, and each vacuum point is labeled with a "V" character. The labeling aids the operator in identifying each plotted point with the corresponding vehicle performance criteria. The labelling also aids in visually distinguishing among the different displayed vehicle performance criteria, and in coordinating the calculated performance value signals with the corresponding engine speed value at which they were calculated at. It is to be understood however that the particular characters chosen to label the points are exemplary; any character labelling scheme can be chosen so long as it distinguishes between the vehicle performance criteria.

In further accord with the present invention, the plotted points of each vehicle performance criterion are connected together with a line 415–417. That is, line 415 connects the timing points, line 416 connects the dwell points, and line 417 connects the vacuum points. Each line results in a displayed waveform that more readily illustrates the trend of the values of the corresponding ones of the calculated performance value signals over the set of vehicle engine speeds.

Although it cannot be discerned from FIG. 6, each line is of a certain color or shade of grey depending on whether a color monitor or monochrome monitor is employed as the video monitor 14 of the equipment 10. The different line/shade coloring helps the operator to further distinguish between the criteria. Also, if different colors or shades are unavailable on the monitor, lines having different physical characteristics (e.g., different dot/dash compositions) can be used to distinguish between the criteria.

As illustrated in FIG. 5, the timing column is to the left of the abscissa, while the average dwell and vacuum columns are to the right of the abscissa. However, any arrangement of the columns can be utilized if desired without detracting from the scope of the present invention. Also, the criteria axis is oriented vertically while the engine speed axis is oriented horizontally. However, the axes' orientation can be reversed if desired.

As illustrated in FIG. 5, three vehicle performance criteria (timing, dwell, vacuum) are plotted in a rectangular coordinate system with respect to an abscissa labeled in engine speed. However, any number of criteria can have the corresponding values of the calculated performance value signals be plotted with respect to engine speed without detracting from the scope of the present invention.

Although the invention has been illustrated and described with respect to exemplary embodiments thereof, it should be understood by those skilled in the art that the foregoing and various other changes, omissions and additions may be made therein and thereto, without departing from the spirit and scope of the invention.

I claim:

1. Apparatus for providing a display of vehicle performance information, comprising:

sensor means, for providing sensed signals indicative of the actual values of one or more vehicle parameters at each of a plurality of vehicle engine speeds;

signal processing means, having memory means for storing data, including data comprising one or more algorithmic subroutines, each said subroutine corresponding to a selected vehicle performance criterion, said processing means being responsive to said sensed signals to utilize each said subroutine with a related one or more of said sensed signals to calculate, at each said vehicle engine speed, a performance value corresponding to a related one of said selected vehicle performance criteria; and display means, responsive to said calculated performance values, for providing a rectangular coordinate system display format having the value of each said calculated performance value plotted as a discrete point at a first coordinate value measured with respect to a first rectangular axis scaled in units of engine speed, and at a second coordinate value measured with respect to a second rectangular axis scaled in units of said calculated performance value, said display means comprising means for displaying each said discrete point as an alphanumeric character chosen to identify said plotted point with a corresponding one of said selected vehicle performance indicia.

2. Apparatus for providing a display of vehicle performance information, comprising:

sensor means, for providing sensed signals indicative of the actual values of one or more vehicle parameters at each of a plurality of vehicle engine speeds;

signal processing means, having memory means for storing data including data comprising one or more algorithmic subroutines, each said subroutine corresponding to a selected vehicle performance criterion, said processing means being responsive to said sensed signals to utilize each said subroutine with a related one or moore of said sensed signals to calculate, at each said vehicle engine speed, a performance value corresponding to a related one of said selected vehicle performance criteria; and display means, responsive to said calculated performance values, for providing a rectangular coordinate system display format having the value of each said calculated performance value plotted as a discrete point at a first coordinate value measured with respect to a first rectangular axis scaled in units of engine speed, and at a second coordinate value measured with respect to a second rectangular value axis scaled in units of said calculated performance value signal, wherein said display means comprises means for displaying said second rectangular axis as having said scaled units of each of said calculated performance values arranged in related columns, each said column corresponding to a related one of said selected vehicle performance criteria.

3. The apparatus of claim 1 or 2, wherein said display means comprises means for displaying each said discrete point of a corresponding one of said selected vehicle performance criteria as being connected together with a line, each said line having different visual characteristics from each other said line so as to differentiate between said selected vehicle performance criteria, whereby each said line results inn a displayed waveform illustrating the trend of the values of the corresponding ones of said calculated performance values over said plurality of vehicle engine speeds.

4. The apparatus of claim 1 or 2, wherein at least one of said selected vehicle performance criteria is engine cylinder dwell, said subroutines including a subroutine corresponding to engine cylinder dwell, said processing means utilizing said dwell subroutine with a related one or more of said sensed signals to calculate, at each said vehicle engine speed, an engine cylinder dwell value.

5. The apparatus of claim 4, wherein said memory means comprises means for storing said calculated dwell values, said stored subroutines including a subroutine corresponding to average dwell, said processing means utilizing said average dwell subroutine with the most recent ones of said stored dwell values to calculate, at each said vehicle engine speed, a value indicative of average dwell, said rectangular coordinate system display format having each said calculated average dwell values plotted as a discrete point at a first coordinate value measured with respect to said engine speed axis, and at a second coordinate value measured with respect to said second rectangular axis scaled in units of said calculated average dwell value.

6. The apparatus of claim 2, wherein at least one of said selected vehicle performance criteria is engine timing, said stored subroutines including a subroutine corresponding to engine timing, said processing means utilizing said timing subroutine with a related one or more of said sensed signals to calculate, at each said vehicle engine speed, an engine timing value, said rectangular coordinate system display format having each said calculated timing value plotted as a discrete point at a first coordinate value measured with respect to said engine speed axis, and at a second coordinate value measured with respect to said second rectangular axis scaled in units of said calculated timing value.

7. The apparatus of claim 1 or 2, wherein at least one of said selected vehicle performance criteria is engine intake manifold vacuum, said stored subroutines including a subroutine corresponding to intake manifold vacuum, said processing means utilizing said vacuum subroutine with a related one or more of said sensed signals-to calculate, at each said vehicle engine speed, an intake manifold vacuum value, said rectangular coordinate system display format having each said calculated vacuum value plotted as a discrete point at a first coordinate value measured with respect to said engine speed axis, and at a second coordinate value measured with respect to said second rectangular axis scaled in units of said calculated vacuum value.

8. The apparatus of claim 1, wherein said display means comprises means for displaying each said alphanumeric character of a corresponding one of said selected vehicle performance criteria as being connected together with a line, each said line having different visual characteristics from each other said line so as to differentiate between said selected vehicle performance criteria, whereby each said line results in a displayed waveform illustrating the trend of the corresponding ones of said calculated performance values over said plurality of vehicle engine speeds.

9. Apparatus for providing a display of vehicle performance information, comprising:

sensor means, for providing sensed signals indicative of the actual values of one or more vehicle parameters at each of a plurality of vehicle engine speeds;

signal processing means having memory means for storing data, including data comprising one or more algorithmic subroutines, each said subroutine corresponding to one of a plurality of selected vehicle performance criteria including engine cylinder dwell, average engine cylinder dwell, engine timing, and intake manifold vacuum, said processing means being responsive to said sensed signals to utilize each said subroutine with a related one or more of said subroutine with a related one or more of said sensed signals to calculate, at each said vehicle engine speed, a performance value corresponding to a related one of said vehicle performance criteria, said processing means utilizing said engine cylinder dwell subroutine with a related one or more of said sensed signals to calculate, at each said vehicle engine speed, an engine cylinder dwell value, said memory means comprising means for storing said calculated dwelll values, said processing means utilizing said average dwell subroutine with the most recent ones of said stored dwell values to calculate, at each said vehicle engine speed, a value indicative of average dwell, said processing means utilizing said timing subroutine with a related one or more of said sensed signals to calculate, at each said vehicle engine speed, an engine timing value, said processing means utilizing said vacuum subroutine with a related one or more of said sensed signals to calculate, et each said vehicle engine speed, an intake manifold vacuum value, said calculated vehicle performance values including said calculated timing, vacuum and average dwell values; and display means, responsive to said calculated vehicle performance values, for providing a rectangular coordinate system display format having each calculated vehicle performance values plotted as a discrete point at a first coordinate value measured with respect to a first rectangular axis scaled in units of engine speed, and at a second coordinate value measured with respect to a second rectangular axis scaled in units of the corresponding one of said calculated vehicle performance values, said rectangular coordinate system display format having each said calculated average dwell value plotted as a discrete point at a first coordinate value measured with respect to said engine speed axis, and at a second coordinate value measured with respect to said second rectangular axis scaled in units of said calculated average dwelll value, said rectangular coordinate system display format having each said calculated timing value plotted as a discrete point at a first coordinate value measured with respect to said engine speed axis, and at a second coordinate value measured with respect too said second rectangular axis scaled in units of said calculated timing value, said rectangular coordinate system display format having each said calculated vacuum value plotted as a discrete point at a first coordinate value measured with respect to said engine speed axis, and at a second coordinate value measured with respect to said second rectangular axis scaled in units of said calculated vacuum value, said display means comprising means for displaying said second rectangular axis as having said scaled units of each of said calculated performance values arranged in related columns, each said column corresponding to a related one of said selected vehicle performance criteria, said display means comprising means for displaying each said discrete point as an alphanumeric character chosen to identify said plotted point with the corresponding one of said selected vehicle performance criteria, said display means comprising means for displaying each said alphanumeric character of a corresponding one of said selected vehicle performance criteria as being connected together with a line, each said line having different visual characteristics from each other said line so as to differentiate between said selected vehicle performance criteria, whereby each said line results in a displayed waveform illustrating the trend of the corresponding ones of said calculated performance values over said plurality of vehicle engine speeds.

* * * * *